(12) United States Patent
Lair

(10) Patent No.: US 6,688,099 B2
(45) Date of Patent: Feb. 10, 2004

(54) VARIABLE AREA THRUST REVERSER NOZZLE

(75) Inventor: Jean-Pierre Lair, San Antonio, TX (US)

(73) Assignee: The Nordam Group, Inc., Tulsa, OK (US)

( * ) Notice: Subject to any disclaimer, the term of this patent is extended or adjusted under 35 U.S.C. 154(b) by 0 days.

(21) Appl. No.: 10/440,842

(22) Filed: May 19, 2003

(65) Prior Publication Data

US 2003/0218094 A1 Nov. 27, 2003

Related U.S. Application Data

(60) Provisional application No. 60/382,393, filed on May 21, 2002.

(51) Int. Cl.[7] .................................................. F02K 1/12
(52) U.S. Cl. ..................................................... 60/226.2
(58) Field of Search ..................... 60/226.2; 244/110 B; 239/265.37

(56) References Cited

U.S. PATENT DOCUMENTS

| | | |
|---|---|---|
| 3,020,712 A | 2/1962 | Dolliver |
| 3,532,275 A | 10/1970 | Hom et al. |
| 3,579,991 A | 5/1971 | Nelson |
| 3,604,662 A | 9/1971 | Nelson |
| 4,030,687 A | 6/1977 | Hapke |
| 4,194,692 A | 3/1980 | Dickenson |
| 4,422,605 A | 12/1983 | Fage |
| 4,424,669 A | 1/1984 | Fage |
| 5,176,340 A | 1/1993 | Lair |
| 5,181,676 A | 1/1993 | Lair |
| 5,310,117 A | 5/1994 | Fage et al. |
| 5,775,639 A | 7/1998 | Fage |
| 5,853,148 A | 12/1998 | Standish et al. |
| 6,260,801 B1 | 7/2001 | Peters et al. |

*Primary Examiner*—Ehud Gartenberg
(74) *Attorney, Agent, or Firm*—Francis L. Conte

(57) ABSTRACT

A turbofan exhaust nozzle includes a jet pipe having a pair of thrust reverser doors disposed on opposite sides thereof. Each door has a hinge arm joined to a swing arm, which in turn is joined to the pipe. Each door also includes a latching clip at a forward end, and a deployment clevis between the clip and hinge arm. A common actuator is connected to both doors by corresponding links joined to the clevises for driving the links aft to pivot aft the doors and swing arms. A first lock selectively locks the latching clip and a second lock selectively locks the swing arms in coordination with the first lock for permitting variable area axial movement of the doors, thrust reverser deployment thereof, and retraction to stowed positions of the doors.

26 Claims, 14 Drawing Sheets

VARIABLE AREA THRUST REVERSER NOZZLE

This application claims the benefit of Provisional Application No. 60/382,393; filed May 21, 2002.

BACKGROUND OF THE INVENTION

The present invention relates generally to aircraft turbofan engines, and, more specifically, to exhaust nozzles therefor.

Thrust reversers that integrate variable exhaust nozzles are known in the art. A typical example of a target reverser with throat adjustment capability is described in U.S. Pat. No. 5,181,676. It is composed of a fixed structure 34 (reference numbers are those in the patent) commonly called jet pipe, on which are hinged a pair of thrust reverser doors 30 and a pair of shells 44. When the reverser doors 30 are stowed, the pair of shells 44 cooperate with the pair of thrust reverser doors to ensure that the exhaust nozzle is planar.

The pivots 40 of the reverser doors, which are linked to the corresponding pivots 58 of the shells via arms 56, have the capability of undergoing radial and longitudinal displacements that confer area adjustment capability to the throat of the exhaust nozzle. The nozzle exhaust area variation capability allows, in forward thrust mode, the adjustment of the exhaust area to the particular value required for achievement of optimum performance for the particular flight conditions.

In this prior art patent the adjustment of the throat area of the nozzle is performed by actuation means 50, while the deployment of the thrust reverser is performed by different actuation means 52. The use of a dedicated actuation system 50 for the variable nozzle function of the apparatus described has also the advantage of allowing the locking of the thrust reverser door pivots in their most rearward position while the reverser doors, by actuation means 52, are deployed and during their travel from their deployed position to their stowed position.

The locking of the reverser door pivots during the stowing mode of the reverser is necessary so that the latch receptacle 66 can re-engage the latch arm 54. If previous mentioned locking of the pivots of the thrust reverser doors is not performed prior to moving the reverser from its deployed position to its stow position, then the dedicated actuation system 52 of the reverser doors would rotate and forwardly translate the pivots of the reverser and consequently prevent its complete stowing as its latch receptacles 66 would miss their respective target 54.

While the use of a dedicated actuation means for varying the area of the exhaust nozzle and the use of a second actuator means for deploying the reverser is mechanically attractive by its simplicity, experience shows that the space required for installation of these dedicated actuation means is often not compatible with the available space.

A first desired object is to overcome the drawbacks of prior art jet engine variable nozzles integrated to thrust reversers, and to use the same actuation means for performing the adjustment of the value of the exhaust area of the nozzle and for performing the deployment/stowing of the thrust reverser.

A second object is to provide, for forward thrust mode, fixed retainers for keeping the reverser in its stowed position.

A third object is to give, for forward thrust mode, the capability to previous fixed retainers to accommodate the longitudinal and radial motions of the reverser nozzle assembly, for adjustment of the value of the exhaust area of the nozzle.

A fourth object is to configure previous fixed door retainers such that the reverser doors, for deployment purpose, can only disengage the fixed retainers once the doors have moved downstream of the position corresponding to the value of maximum area of the exhaust nozzle.

A fifth object is to provide, in forward thrust mode, a locking means of the position of the reverser nozzle assembly, when the value of the exhaust area of the nozzle is minimum.

A sixth object is to provide, in forward thrust mode, a locking means of the position of the reverser nozzle assembly, when the value of the exhaust area of the nozzle has reached its maximum.

A seventh object is to allow, for forward thrust mode, the manual setting of the maximum value of the area of the exhaust nozzle.

An eighth object is to allow, for reverse mode, a locking means of the position of the reverser door pivots when the reverser door pivots have reached their deployed position, for deployment of the thrust reverser and for a portion of the transit of the reverser from its deployed to its stowed position.

A ninth object is to provide an automatic unlocking means of the position of the reverser door pivots, during transit to stow, for completion of the reverser stowing transit sequence, once the reverser door receptacles have re-engaged their respective fixed retainers.

A tenth object is to use the thrust reverser doors as the muscle for previous unlocking means.

Yet another object is to provide the same, or possibly improved protection against an inadvertent deployment of the reverser compared to the prior art.

BRIEF SUMMARY OF THE INVENTION

A turbofan exhaust nozzle includes a jet pipe having a pair of thrust reverser doors disposed on opposite sides thereof. Each door has a hinge arm joined to a swing arm, which in turn is joined to the pipe. Each door also includes a latching clip at a forward end, and a deployment clevis between the clip and hinge arm. A common actuator is connected to both doors by corresponding links joined to the clevises for driving the links aft to pivot aft the doors and swing arms. A first lock selectively locks the latching clip and a second lock selectively locks the swing arms in coordination with the first lock for permitting variable area axial movement of the doors, thrust reverser deployment thereof, and retraction to stowed positions of the doors.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
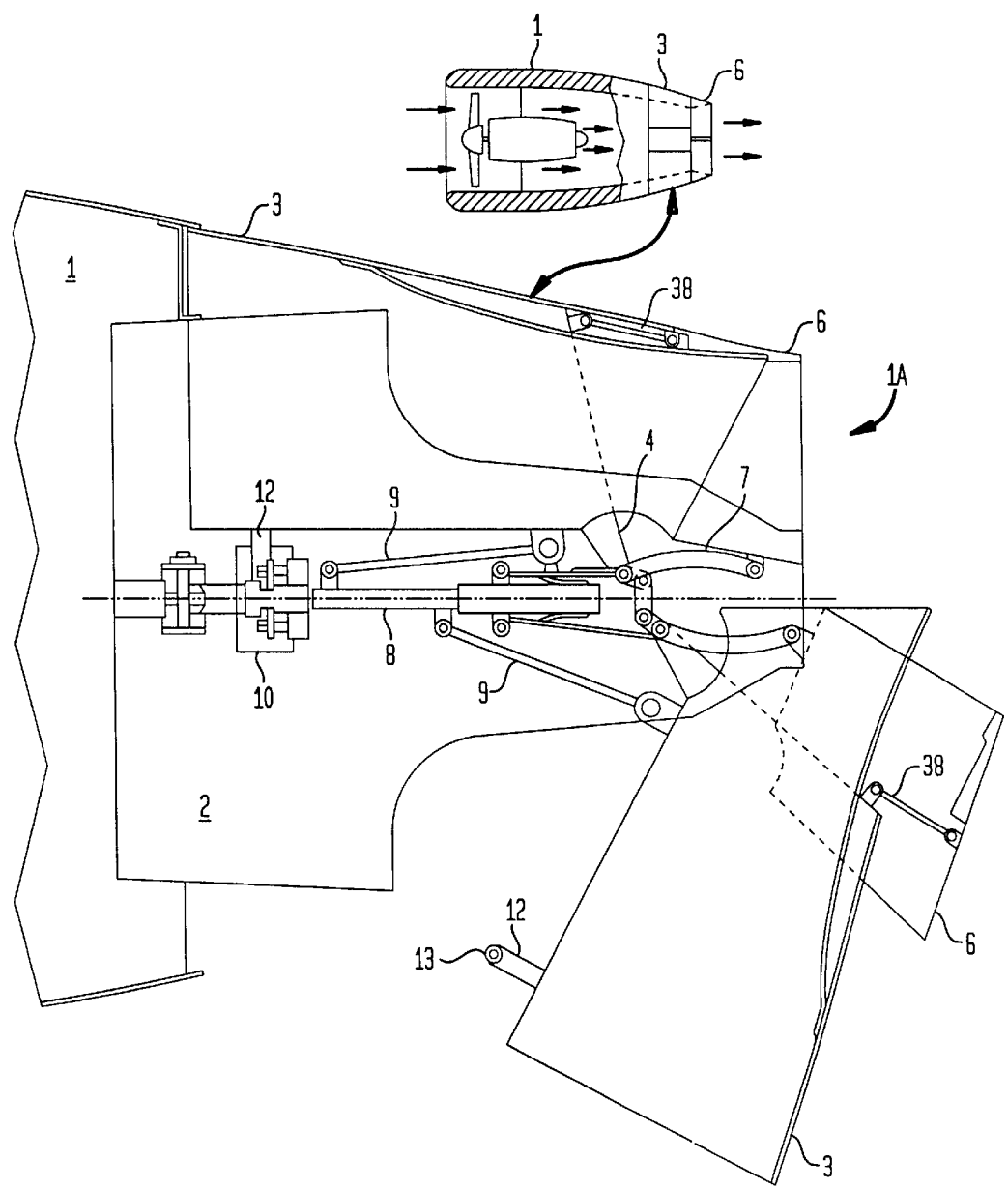
FIG. 1 is a schematic side view of an integrated variable area-thrust reverser nozzle disposed at the aft end of a turbofan engine, with the upper reverser door shown stowed with minimum nozzle discharge exhaust area, and the lower reverser door shown fully deployed for relative comparison.

A planar reverser and variable exhaust area nozzle are combined for turbofan engines. Such an integrated nozzle may be used on business aircraft or commercial aircraft for reducing the noise produced by the engine at takeoff, for optimizing the aircraft takeoff, climb and cruise performance, as well as for decelerating the aircraft at landing. The nozzle can be installed on long nacelles of turbofan engines that are fitted on the fuselage or under the wings of an aircraft.

The thrust reverser nozzle comprises the same actuation means for automatically adjusting the value of the area of the exhaust nozzle for forward mode of operation, and for deploying the thrust reverser for reverse mode of operation. Furthermore, the nozzle comprises at least an upstream fixed thrust reverser doors retainer, at least an upstream locking means of the position of the reverser nozzle assembly, when the value of the exhaust area is minimum or has reached its maximum, at least a downstream locking means of the position of the reverser door pivots once the reverser door pivots have reached their deployed position, and an automatic unlocking of the reverser door pivots locking means, for completion of the stowing sequence and using the thrust reverser doors as a muscle.

The fixed reverser doors retainer is installed on the fixed structure on which is pivotally mounted the reverser nozzle assembly. Its function is to retain and guide, via a guiding track, the rollers of the receptacles of the reverser nozzle assembly in the forward thrust mode to allow the adjustment of the value of the area of the exhaust nozzle, for forward mode of operation.

Furthermore, the guiding track of the reverser doors retainer is configured to allow the disengagement of the receptacle rollers of the reverser doors, so that the reverser doors can be pivotally positioned to their deployed position, only after the reverser doors receptacle rollers has moved away and downstream of the position corresponding to the maximum value of the area of the exhaust nozzle. The guiding track of the thrust reverser doors retainer is also configured to ensure the proper re-engagement of the receptacle rollers during the stowing sequence once the longitudinal position of the reverser door pivots has been unlocked.

The function of the upstream locking means is to provide a mechanical stop to the thrust reverser nozzle assembly for operation in forward thrust mode: 1) provide a mechanical stop to the thrust reverser nozzle assembly when the value of the exhaust nozzle is minimum, and 2) provide a mechanical stop to the thrust reverser nozzle assembly, so that its receptacle rollers cannot pass the position, in their guiding track, that corresponds to the maximum value of the area of the exhaust nozzle.

The upstream locking means can also be manually adjustable, for adjustment of the travel of the reverser door rollers in their guiding tracks, which in turns sets the required maximum value of the area of the exhaust nozzle.

The function of the downstream locking means is to provide a mechanical stop to the thrust reverser door pivots, when the reverser door pivots have reached their deployed position for reverser deployment and during stowing transit from the deployed position, until the receptacle rollers have re-engaged their respective track of their corresponding retainer. Once the reverser door rollers have re-engaged their retainers and reached a predetermined position within them, using the reverser doors as muscle, the unlocking means fitted on the reverser doors automatically unlock the downstream locking means of the reverser door pivots, as well as the upstream locking means.

This action allows the upstream motion of the reverser nozzle assembly as the receptacle rollers move upstream in their guiding tracks for completion of the reverser nozzle stowing sequence. As the thrust reverser nozzle assembly is driven upstream towards stow, the upstream locking means of the forward thrust position re-lock automatically to prevent the downstream longitudinal motion of the reverser nozzle assembly.

The actuation means that control the position of the reverser nozzle assembly can be electro-hydraulic, electro-mechanical, electro-pneumatic or other extendible actuation means. The actuation means of the upstream locking means can also be electro-hydraulic, electro-mechanical, electro-pneumatic or any extendible actuation means. In a preferred embodiment there is a single actuation means on each side of the jet pipe to provide controlled positioning of the reverser nozzle assembly, adjustment of the value of the nozzle exhaust area for forward thrust operation, and deployment of the reverser doors for reverser thrust operation.

For forward thrust operation, a method adapts a reverser nozzle assembly mounted on the aft portion of a nacelle installed on a turbofan engine, by varying the value of the nozzle exhaust area for reducing the noise during takeoff and/or for optimizing engine and aircraft performance and by locking the minimum area and maximum area positions of the nozzle for preventing unwanted reverser deployment in flight.

For reverse thrust operation, the method includes deploying and stowing the reverser nozzle assembly by locking the longitudinal displacement of the reverser door hinges once they have reached their deployed position, by deploying the thrust reverser doors of the reverser nozzle assembly, by keeping the longitudinal displacement of the thrust reverser door hinges locked during a portion of the thrust reverser transit to stow from its deployed position, and by automatically unlocking the thrust reverser door hinges to allow their longitudinal displacement for completion of the reverser stowing sequence.

The exhaust system of U.S. Pat. No. 5,181,676 disclosed above integrates the thrust reverser with variable area exit nozzle features. The present invention relates to the actuation means and locking means of such a thrust reverser that integrates a variable exhaust area nozzle of the type comprising a fixed structure, two thrust reverser doors, two half exhaust nozzles and a sealing means.

The fixed structure, also called jet pipe, is the structure that provides the support for the two thrust reverser doors, the two half exhaust nozzles, the sealing means, the actuation means, and the locking means. The fixed structure cooperates radially and longitudinally with the two thrust reverser doors and the two half exhaust nozzles through a sealing means that ensures fluid tightness for forward thrust operation.

However, and as explained above, the apparatus described in U.S. Pat. No. 5,181,676 uses two specific actuation means. One actuation means is for varying the exhaust area of the nozzle, i.e., increasing or decreasing the exhaust area in forward thrust operation, while the second one is for deploying the thrust reverser doors.

A single and unique actuation means and method of the present invention allows: 1) the adjustment of the nozzle exhaust area for optimization of engine and aircraft performance, 2) the deployment of the reverser doors for decelerating the aircraft at landing, 3) the automatic locking of the longitudinal displacement of the reverser doors hinges for deployment of the reverser nozzle assembly and for a portion of the transit of the reverser nozzle assembly from its deploy to its stow positions, and 4) the automatic unlocking of the longitudinal displacement of the deployed position of the reverser door hinges by the thrust reverser doors while the doors transit from deploy to stow only after the receptacle rollers of the thrust reverser doors have re-engaged and reached a predetermined position within their respective guiding track.

Figure 2:
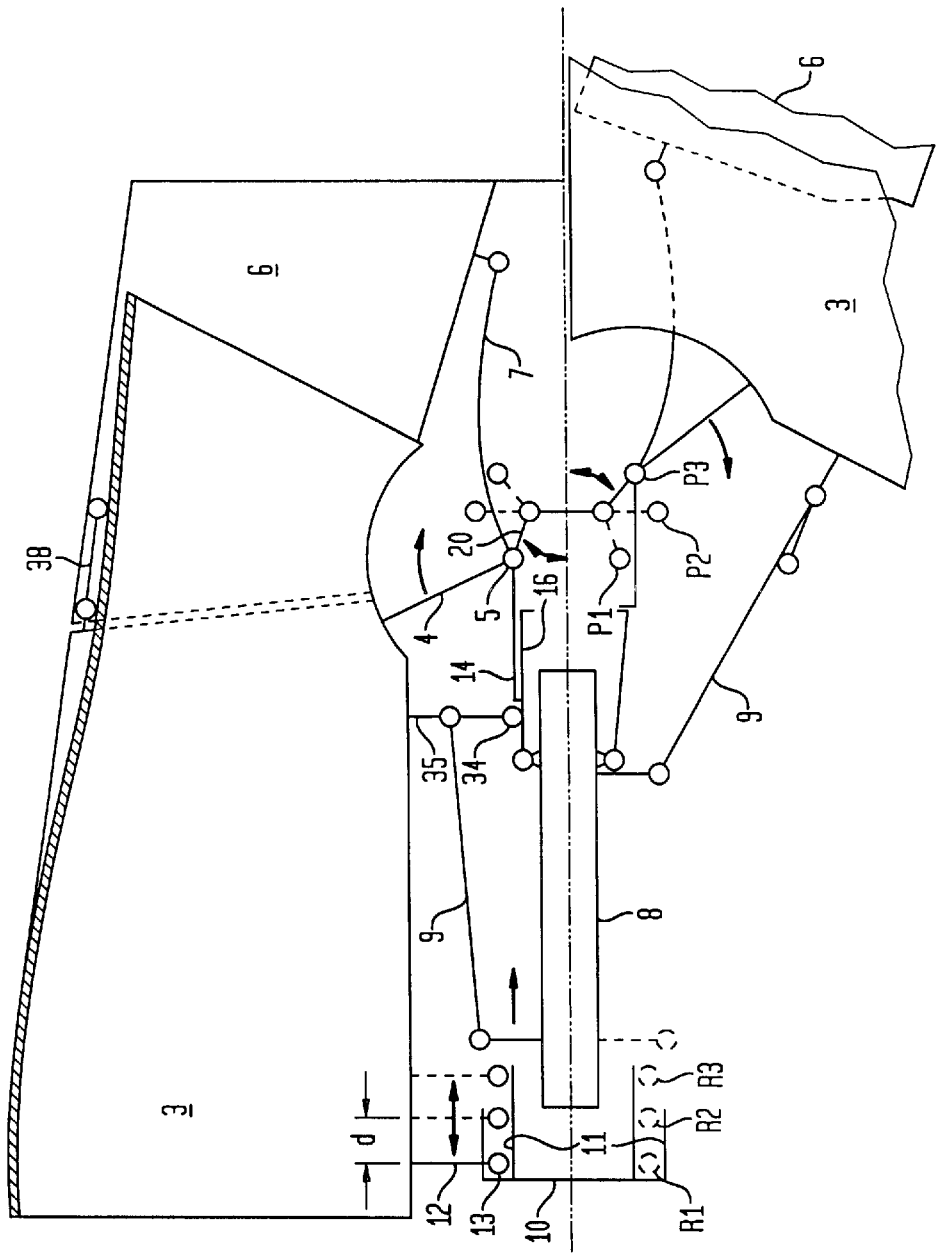
FIG. 2 is a schematic view of the integrated nozzle shown in FIG. 1 illustrating kinematic elements thereof and cooperating forward and aft locking mechanisms.

As shown in FIGS. 1 and 2, a turbofan jet engine 1 is equipped with an exhaust system 1A comprising a fixed structure 2 called jet pipe, two thrust reverser doors 3 respectively hinged on pivoting fittings or hinge arms 4 hinged on the jet pipe along pivot axis 5, and two half exhaust shells or nozzles 6 pivotally mounted on trailing arms 7. A pair of common deployment actuators 8 are mechanically attached to opposite sides of the jet pipe, and are also connected via corresponding deployment rods or links 9 to the thrust reverser doors for controlling in forward thrust operation the adjustment of the value of the exhaust area of the nozzle and for deploying in reverse thrust operation the thrust reverser doors.

As commonly used in the art, the following terminology "stow", "deploy" will be used in the description of the integrated nozzle where "stow" depicts a retracted thrust reverser that is in forward thrust configuration (top half of FIGS. 1,2), while "deploy" depicts a thrust reverser that is in thrust reverse configuration for decelerating the aircraft at landing (bottom half of FIGS. 1,2). Note that FIGS. 1,2 have been shown with the top door stowed and the bottom door deployed for clarity of presentation, but in practice both doors travel identically over their full travel paths from stowed to deployed.

A first lock mechanism or locking means 10A includes a fixed retainer 10 attached to the jet pipe 2 configured with two guiding tracks 11, and has the multiple functions of: 1) retaining the thrust reverser nozzle assembly in the stow configuration for whatever value of the area of the exhaust nozzle, 2) requiring additional travel for deployment of the reverser nozzle assembly beyond the position corresponding to the maximum value of the area of the exhaust nozzle and 3) guiding the reverser nozzle assembly while approaching stow during its transit from deploy, so that it can be re-stowed.

Each longitudinal side of the thrust reverser doors is equipped in its upstream end portion with a latching clip or receptacle 12 that houses a latch pin or roller 13. The rollers 13 remain captured by their associated guiding tracks 11 of the retainer 10 for adapting the value of the area of the exhaust nozzle while the reverser nozzle assembly is in stow configuration.

Figure 3:
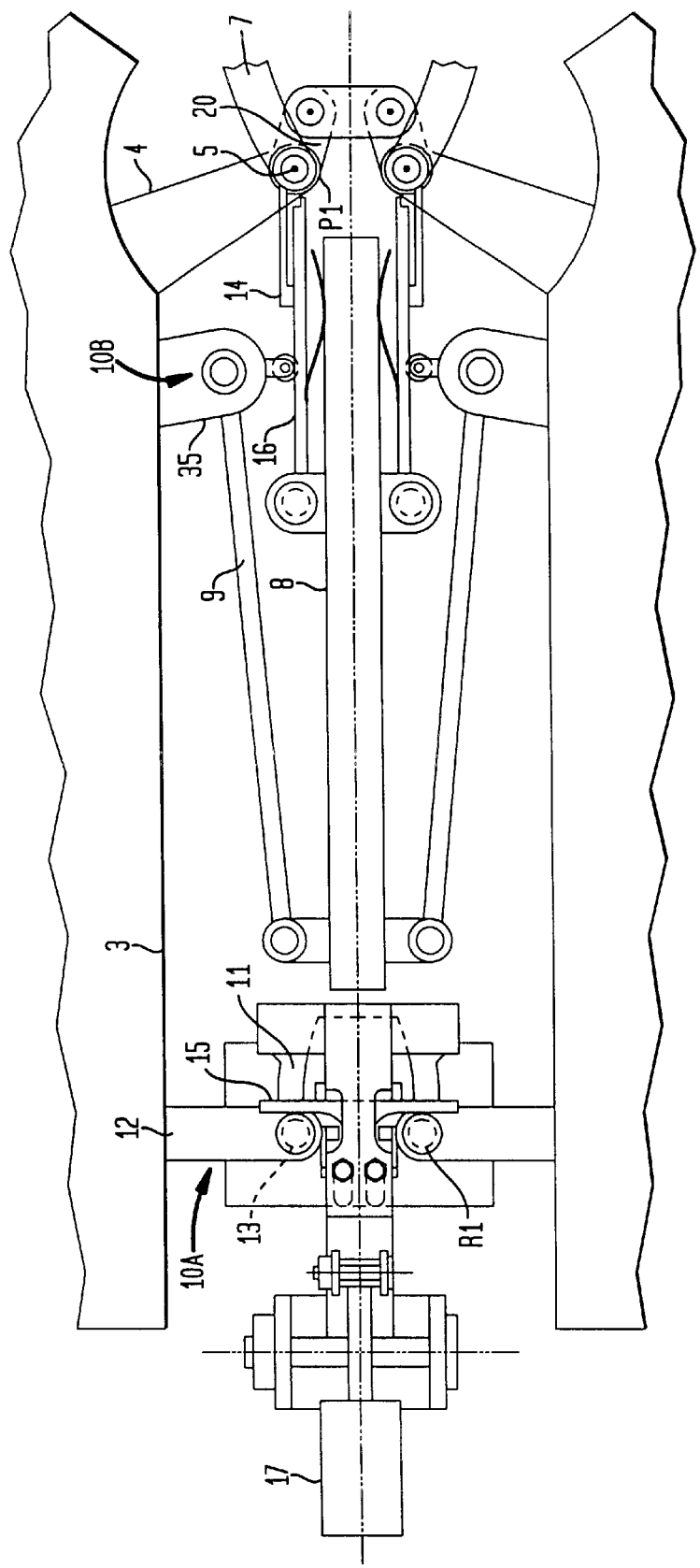
FIG. 3 is an enlarged axial side view of a portion of the nozzle illustrated in FIG. 1 with the doors being in the stowed position with minimum nozzle discharge exhaust area.

With reference to FIG. 3, arms 7 share the same pivoting axis 5 of their corresponding reverser doors hinges 4 and are characterized by having a second lock mechanism or locking means 10B which includes an upstream first locking lever or extension 14. Arms 7 support the half exhaust nozzles 6 while their upstream extensions 14 have the important function of locking any upstream longitudinal motion of the pivots 5 of the reverser doors when the pivots have reached their deployed position and during a portion of the transit of the reverser doors from deploy to stow positions until the rollers 13 have re-engaged and reached a predetermined position within their respective retainers. This particular aspect will become clearer further along the description of this integrated nozzle.

With reference to FIG. 3 the reverser nozzle assembly is in forward thrust position, and the value of the nozzle exhaust area is minimum. The reverser nozzle assembly is kept stowed and locked because rollers 13 housed by the receptacles 12 are retained by the guiding tracks 11 of retainer 10. The position corresponding to the minimum value of the area of the exhaust nozzle is radially locked by the retainer 10 and longitudinally locked by a first stop tab 15 of the upstream locking means or mechanism 10A.

With reference to FIG. 3, and although the upstream extensions 14 of arms 7 are free and overlap a downstream second locking lever 16 of the reverser doors hinges 4, the hinges remain locked longitudinally by the first stop 15 of the upstream lock 10A.

Figure 4:
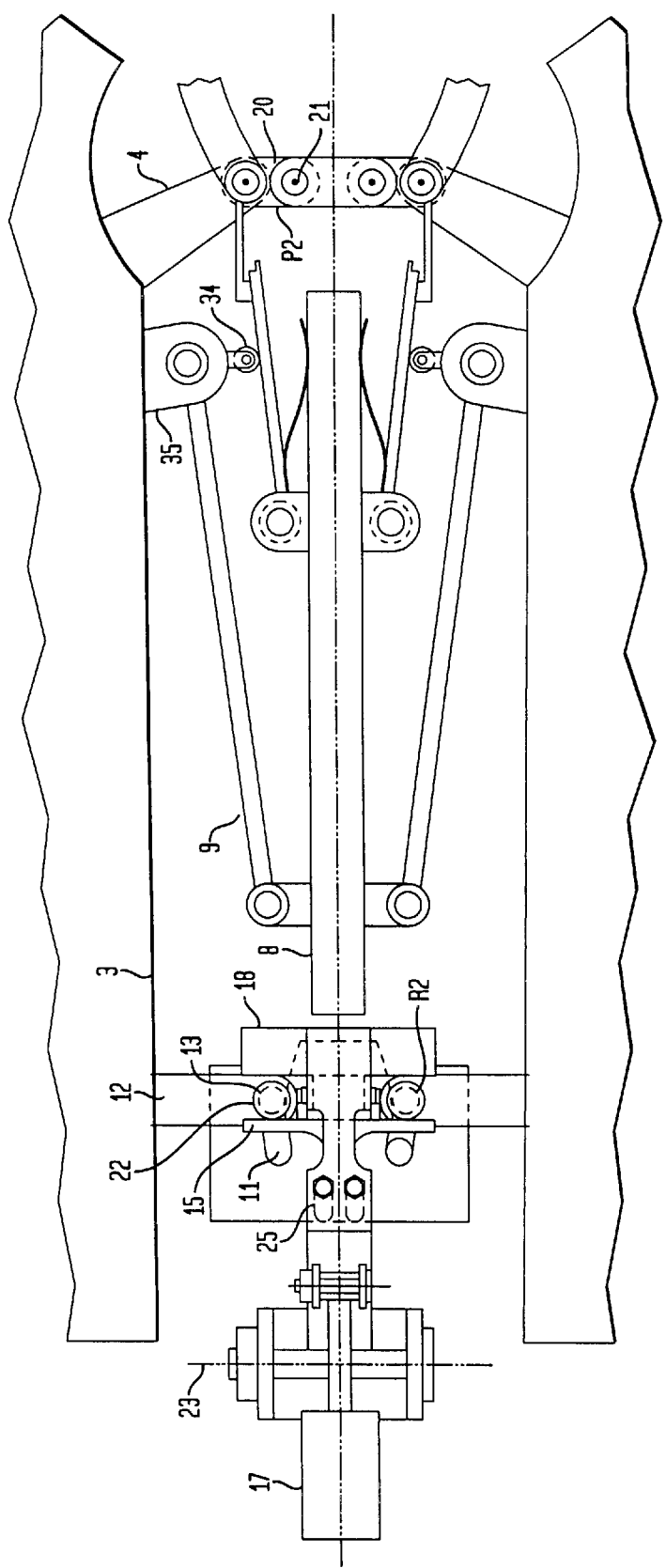
FIG. 4 is a side view of the nozzle, like FIG. 3, with the doors being translated aft with a maximum nozzle discharge exhaust area.

With reference to FIGS. 3, 4 a lock actuator 17 of the upstream lock has unlocked the first stop 15 corresponding to the minimum value of the exhaust area of the nozzle but not the second stop tab 18 corresponding to the maximum value of the exhaust area. The actuator 8 of the thrust reverser nozzle assembly has moved the hinges 4 radially as well as longitudinally via links 9 from their initial first position P1 to the second position P2.

The longitudinal displacement of hinges 4 is possible because the pivots are pivotally mounted on pivoting swing arms 20 hinged on the jet pipe along hinge axis 21. Position P1 of the reverser hinges is the position at which the value of the nozzle exhaust area is minimum, and position P2 is the position for maximum value of the nozzle exhaust area.

As shown in FIG. 2, during this motion the rollers 13 of the reverser doors have traveled a distance "d" in their respective tracks 11 to the second position R2 from their initial first position R1. Position R1 of the rollers 13 corresponds to position P1 of the hinges, while position R2 of the rollers corresponds to position P2 of the hinges.

With reference to FIGS. 2 and 4 the reverser door receptacle rollers 13 are longitudinally prevented from going any further downstream of position R2 in their respective guiding track 11 since the upstream locking means provide the mechanical stop 18 to rollers 22 installed outside receptacles 12 and sharing the same centerline axis with rollers 13. The upstream locking means are pivotally mounted on the jet pipe along an axis 23 that is substantially normal to the axis of their actuator 17 and that is contained in a plane substantially parallel to the plane of symmetry of the reverser doors.

In a preferred embodiment, the actuator 17 that controls the rotation of the upstream locking means is a single effect spring loaded actuator. The actuator 17 is only energized when the pivots of the reverser doors are moving from position P1 towards position P2 and from position P2 to third position P3, but not from position P3 to positions P2 and P1. As required for forward thrust operation, for decreasing the noise during takeoff and for optimization of the performance of the engine, hence of the aircraft, the actuator 8 of the reverser nozzle assembly can position the assembly at minimum or maximum value of the exhaust area of the nozzle, without risking unwanted deployment of the reverser doors.

The introduction of the upstream first lock 10A and the downstream second lock 10B permits the single actuators 8 on each side of the exhaust nozzle to simultaneously translate the reverser doors 3 for variable area capability thereof, following which the doors may be fully pivoted open for thrust reverse operation, with automatic locking of the swing arms 20. The first locks permit locking of the latching clips 12 to prevent pivotal deployment of the reverser doors, while permitting axial movement of the doors between the forward stowed position and the aft intermediate axial position prior to pivotal deployment. The second lock locks the swing arms 20 in their aft pivoted position to prevent forward pivotal movement thereof at the door intermediate position, while permitting pivotal movement of the doors aft for thrust reverser deployment.

FIG. 3 illustrates the axially forward, stowed position of the reverser doors, with the upstream first lock 10A engaged and the downstream second lock 10B disengaged. The latch pin 13 is locked forward of the first tab 15 in the first axial position R1, with the swing arm being disposed in its corresponding axially forward position P1.

In FIG. 4, the lock actuator 17 has been energized to temporarily pivot the two tabs 15,18 away from the guide track 11 for permitting the deployment actuator 8 to drive the reverser doors aft for re-trapping the latch pin 13 between the two stops 15,18 in the intermediate axial position R2. Correspondingly, the swing arm 20 has been pivoted aft to its intermediate position P2, with the two swing arms being colinearly aligned with each other in the radially vertical direction illustrated. This vertical position of the swing arms correspondingly moves outwardly the hinge arms 4 of the reverser doors for achieving the maximum discharge flow area of the exhaust nozzle.

Figure 5:
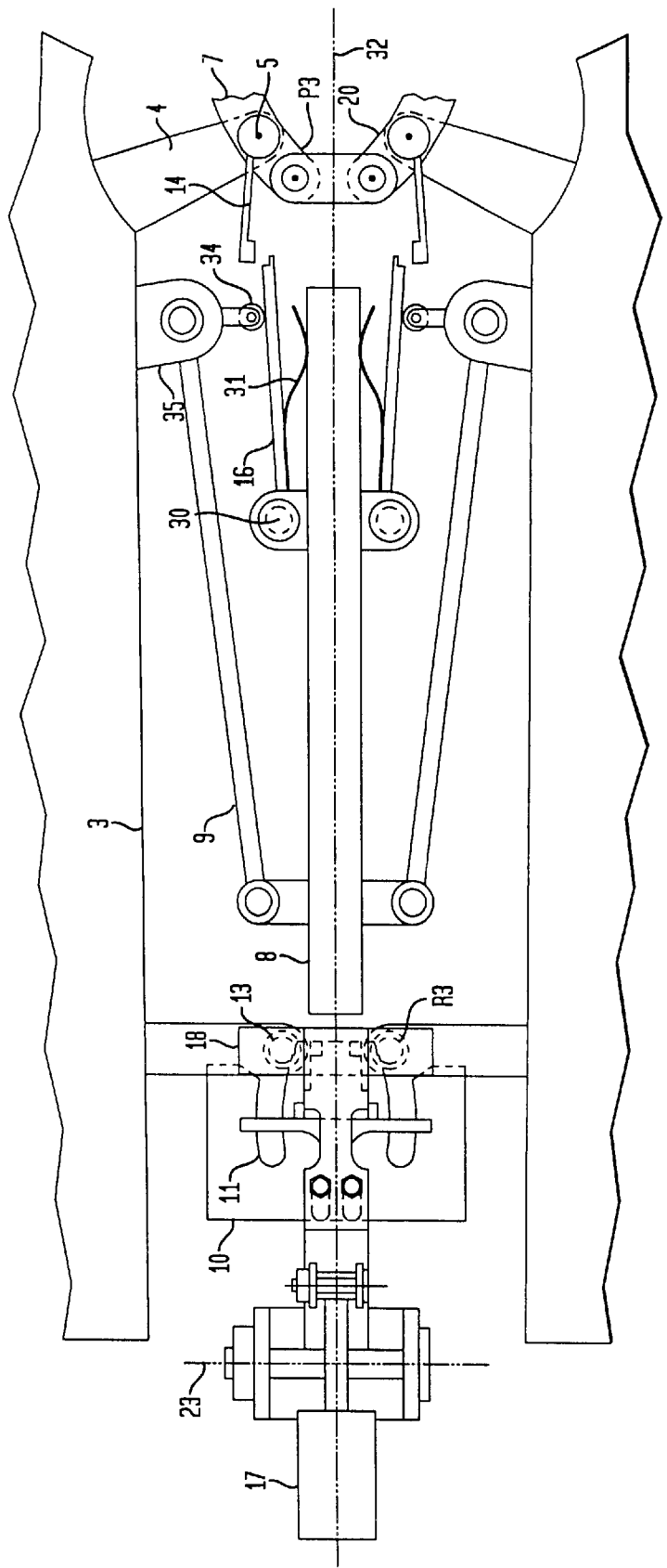
FIG. 5 is a side view, like FIG. 4, with the doors being translated further aft for commencing pivotal deployment thereof for thrust reverse operation.

FIG. 5 illustrates axial translation further aft of the latch pin 13 for clearing the inlet end of the guide track 11 as the second tab 18 is pulled outwardly away therefrom by the actuator 17. The swing arms 20 have been correspondingly pivoted to their aft position as the hinge arms 4 reach their aft-most position. Both the first and second locks for the latch pins 13 and swing arms 20 are disengaged.

Figure 6:
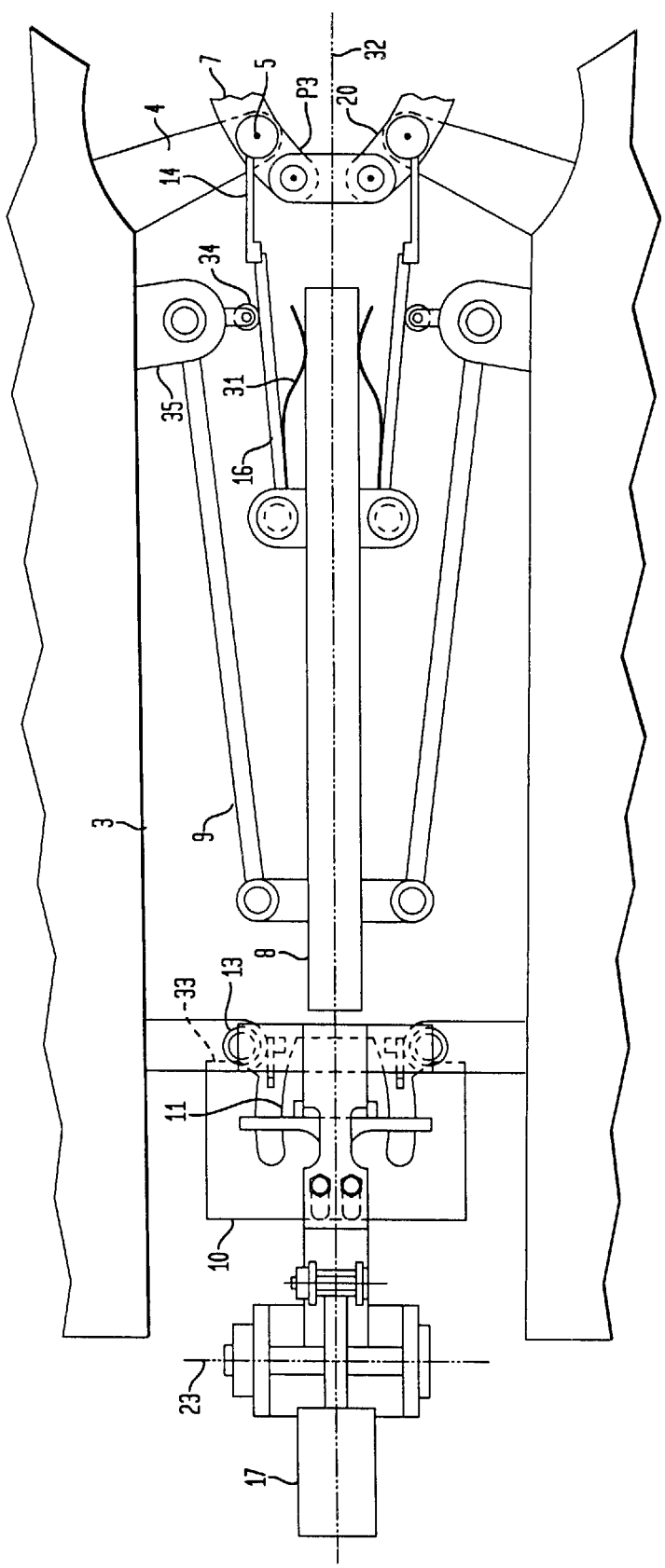
FIG. 6 is a side view, like FIG. 5, of engagement of the aft locking mechanism prior to pivotal deployment of the doors.
Figure 7:
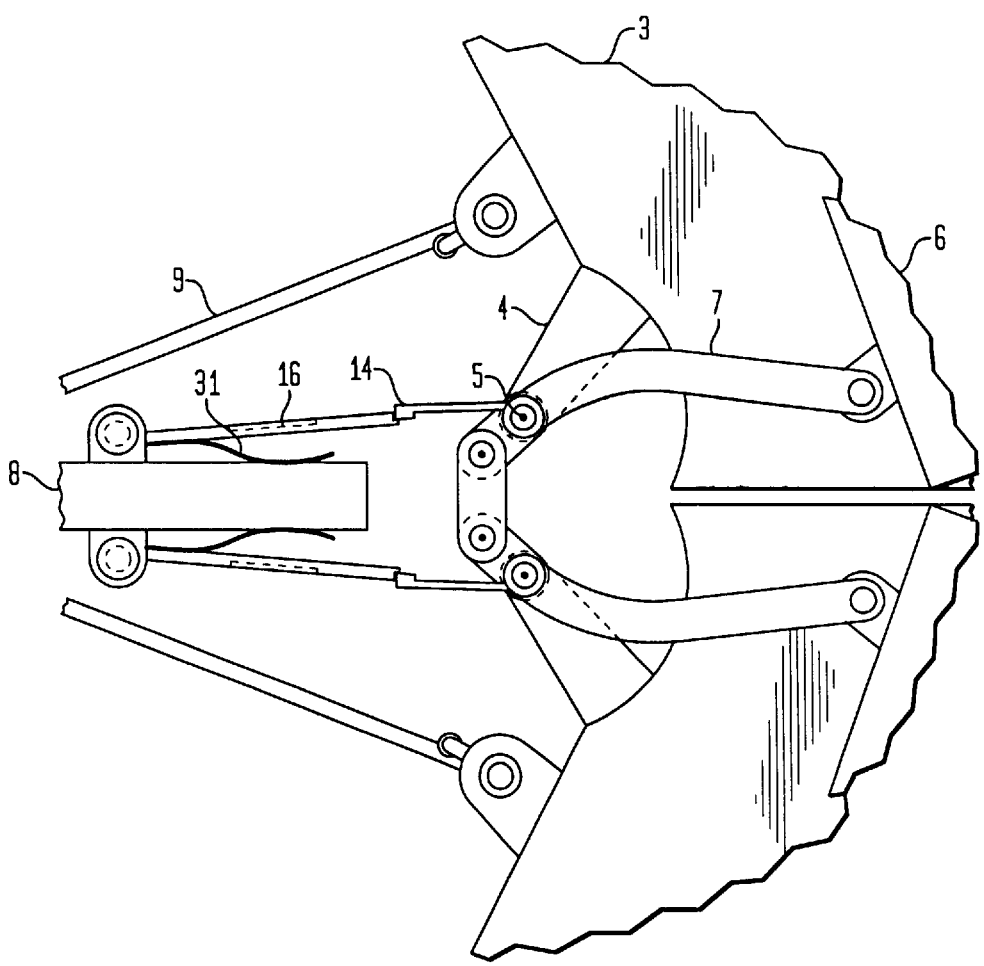
FIG. 7 is a side view, like the aft portion of FIG. 6, in which the doors are pivoted aft to the thrust reverser deployed position.

In FIG. 6, the deployment actuator 8 further drives the control links 9 aft to begin pivoting deployment of the thrust reverser doors. The latch pins 13 rise from their corresponding guide tracks 11 as the reverser doors are driven radially outwardly to their fully deployed position illustrated in FIG. 7.

A preferred embodiment of the upstream first lock mechanism 10A is illustrated in FIGS. 8–13. The first lock configuration illustrated in FIG. 8 corresponds with FIG. 3 in which the roller head 22 of the latch pin 13 is trapped axially forwardly of the first tab 15.

Figure 9:
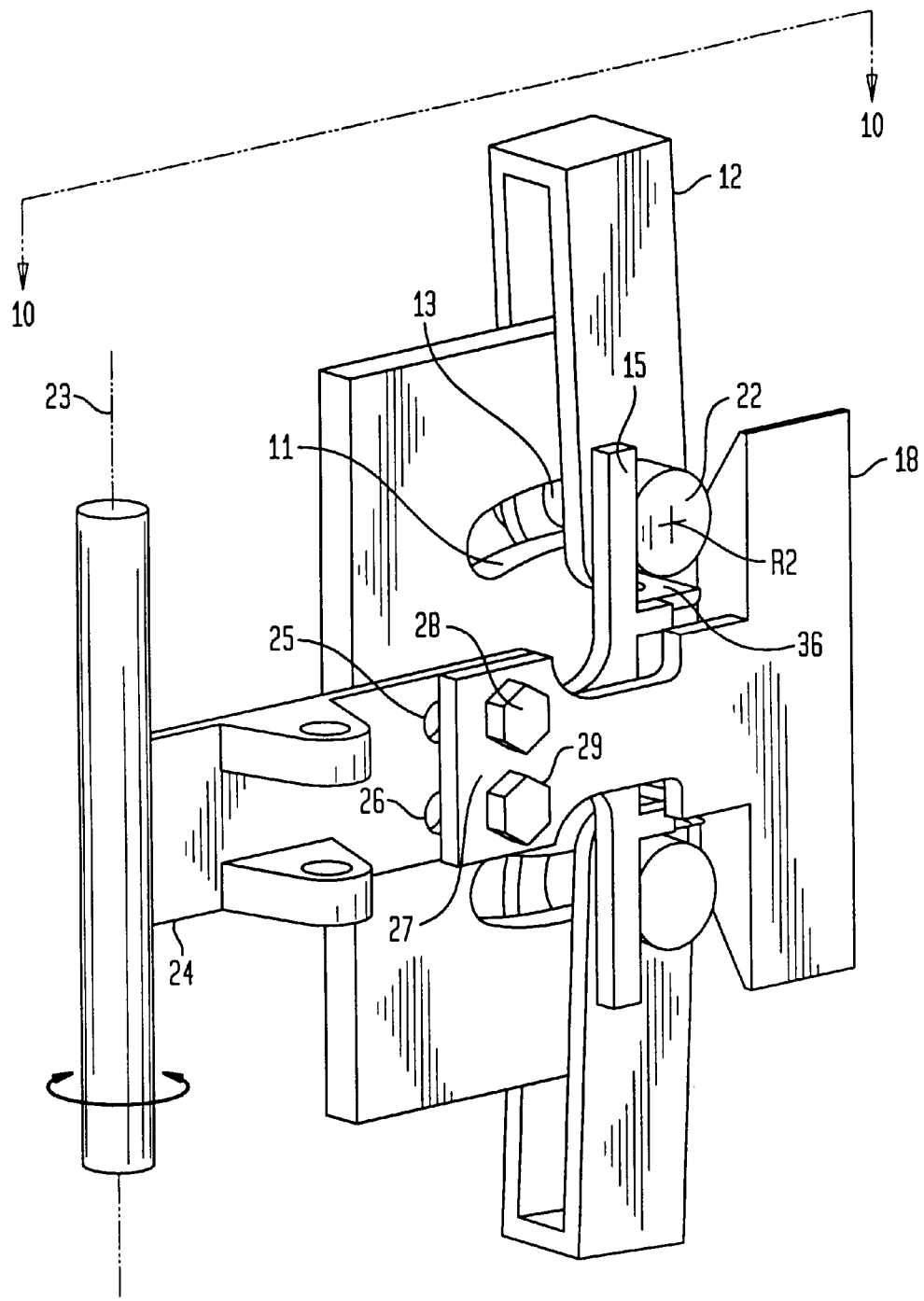
FIG. 9 is another isometric view of the forward locking mechanism illustrated in FIG. 8 with the doors being locked at maximum nozzle discharge exhaust area.

The first lock illustrated in FIG. 9 corresponds with FIG. 4 in which the roller 22 is trapped axially between the first and second tabs 15,18, with the latch pin 13 being radially trapped in the guide track 11.

Figure 10:
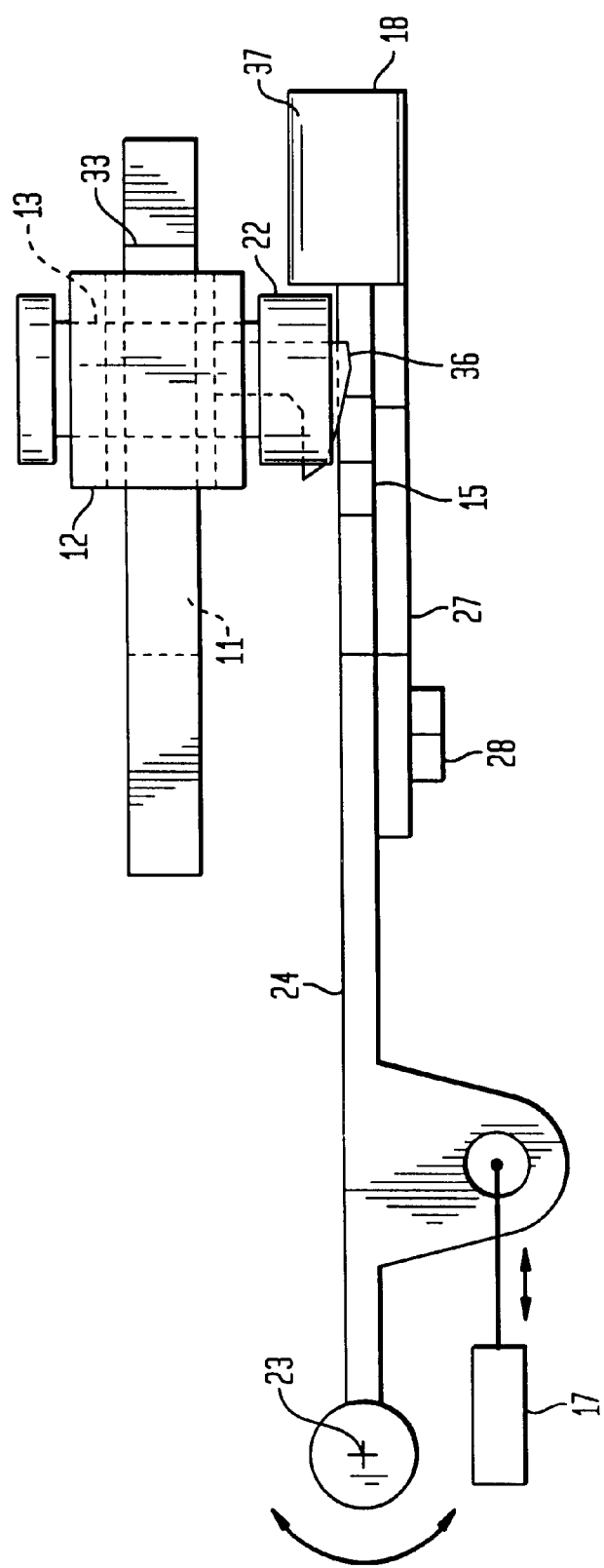
FIG. 10 is a top, plan view of the forward locking mechanism illustrated in FIG. 9 and taken along line 10—10.

FIG. 10 illustrates a top view of the first lock in which the lock actuator 17 is effective for pivoting the two tabs 15,18 outwardly away from the guide track 11 to permit the latch pin and roller 22 to move axially without obstruction by the tabs. Since the actuator 17 is preferably spring-loaded, it may be energized for pulling the tabs away from the guide track 11, and de-energized to permit the internal spring force to return the tabs closely adjacent to the guide track 11.

Figure 11:
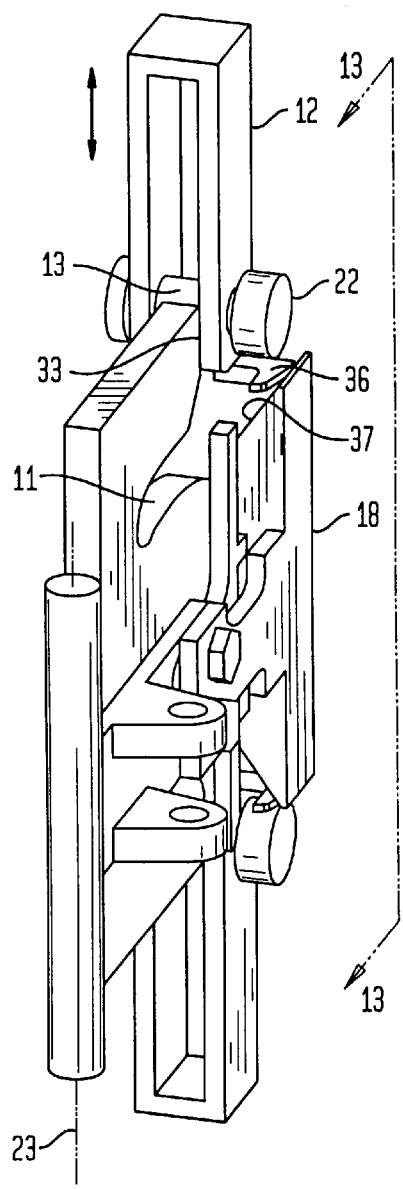
FIG. 11 is a another isometric view of the forward locking mechanism illustrating liberation of a latching clip from the lock.

FIG. 11 illustrates the radially outer position of the latching clip 12 above the second tab 18 as the reverser door is deployed radially outwardly or radially inwardly.

Figure 12:
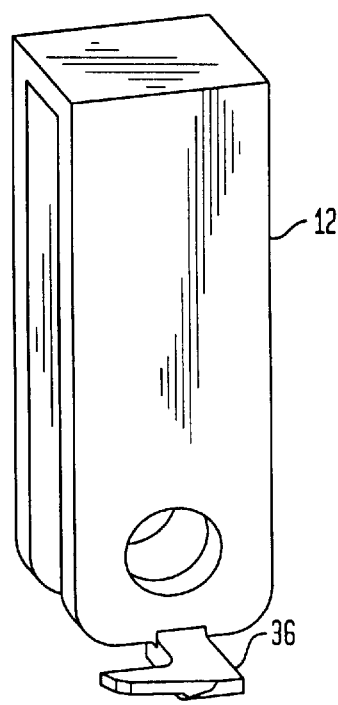
FIG. 12 is an isometric view of an exemplary form of the latching clip illustrated in FIG. 11 in isolation.

FIG. 12 illustrates a preferred form of the latching clip 12 with an integral cam for automatically deflecting the second tab 18 illustrated in FIG. 11 as the reverser door is retracted from its pivoted position. This operation is described in more detail hereinbelow, along with FIGS. 13 and 14 which illustrate automatic displacement of the two stop tabs 15,18 as the reverser door is retracted.

With reference to FIG. 4 the upstream locking means are provided with a manual adjustment capability. This is for manually setting the travel of the rollers 13 in their guide tracks 11 in order to determine the value of the maximum area that the exhaust nozzle will be driven to by the actuation means 8.

As more clearly shown on FIG. 9 the upstream locking means are substantially composed of two stops tabs, the upstream tab 15 for locking the position that corresponds to the minimum value of the exhaust area, and the downstream tab 18 for stopping the travel of the rollers 22 so that the associated rollers 13 do not pass the position R2 (FIG. 2) that corresponds to the maximum value of the area of the exhaust nozzle.

The first mounting plate or fitting 24 that holds the upstream stop 15 is provided with at least two oblong holes 25,26 so that the second fitting plate 27 that holds the downstream stop 18 and that mounts on the first fitting 24 can be longitudinally adjusted manually, via associated bolts 28,29, for setting the value of the maximum area of the exhaust nozzle. The single effect spring-loaded actuator 17 can be electro-hydraulic, electro-mechanic or electro-pneumatic and controls the pivotal motion of the upstream locking plates 24,27. In a preferred embodiment, there are two sets of locking plates 24,27 and their associated tabs 15,18 per reverser nozzle assembly, one inboard and one outboard.

With reference to FIGS. 2 and 5 for reverser operation, the actuator 17 further rotates the upstream locking means around its axis 23. This unlocks stop 18 of the upstream locking means of the rollers 22 so that the actuator 8 of the reverser nozzle assembly can drive longitudinally the assembly beyond and downstream of the position R2 of the rollers 13 that corresponds to the maximum value of the exhaust area of the exhaust nozzle. The actuators 8 via links 9 have driven the hinges 4 of the reverser doors to their deployed position P3, and the rollers 13 have moved to their third position R3 in their guiding tracks 11. For this position of the reverser nozzle assembly, the rollers 13 are still in contact with the longer inner sides of their associated guiding tracks 11, but are now no longer radially captured by retainer 10 having cleared the shorter top sides of the tracks 11.

Also shown in FIG. 5, when the reverser doors hinges 4 reach their deployed position, the supporting arms 7 of the exhaust nozzle have also moved downstream, longitudinally and radially, since the supporting arms share the same pivoting axis 5 with their respective reverser doors hinges 4. The upstream extensions 14 of arms 7 now uncover the downstream locking levers 16 that are now free to pivot around their upstream pivot axis 30 when the reverser doors 3 are moving from this position towards their deploy position. Axes 30 are substantially parallel to the pivoting axes 5 of the thrust reverser doors 3.

The downstream locking levers 16 pivot away from the longitudinal centerline axis 32 of the actuator 8 as they are spring loaded by leaf springs 31. For this position of the reverser door pivots, the downstream locking means do not yet lock the upstream extension 14 of arms 7. This aspect of the assembly is fundamental as it allows the relocking of the reverser nozzle assembly in the stow configuration when the assembly is moved from its deploy position to its stow position.

Figure 13:
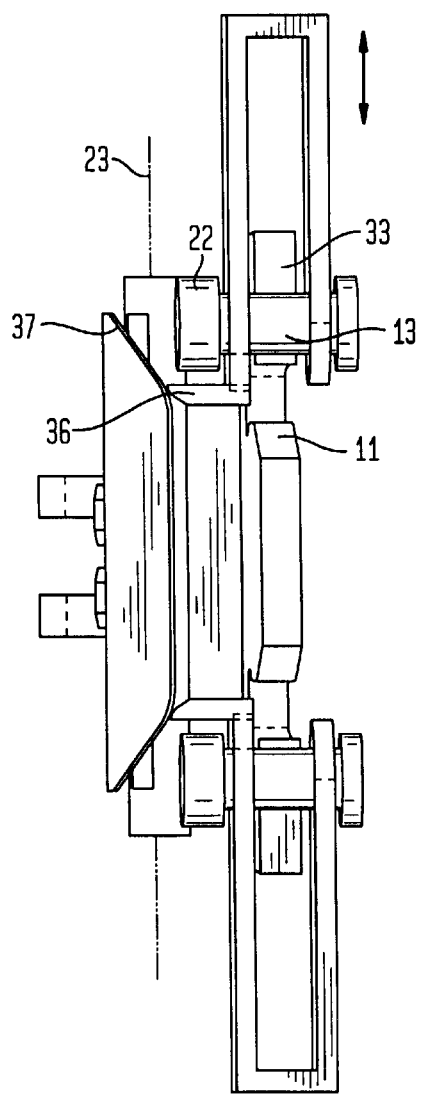
FIG. 13 is an elevational forward-facing-aft view of the forward locking mechanism illustrated in FIG. 11 and taken along line 13—13.

As the reverser nozzle assembly is moving towards its deploy position by actuator 8, and as shown in FIGS. 6 and 13, the rollers 13 are radially moving away from their associated guiding tracks 11. For this position of the rollers 13, the reverser doors 3 have further pivoted around their respective axis 5, and the downstream locking levers 16, under the action of their associated springs 31, move further away from the longitudinal axis 32 of the actuator 8, locking the upstream extension 14 of arms 7 and consequently preventing any upstream longitudinal displacement of the reverser door hinges 4.

This aspect of the assembly is also fundamental as it allows the use of the same actuator 8 for varying the value of the exhaust area of the nozzle and for deploying the thrust reverser nozzle assembly. The actuator 8 can no longer communicate a longitudinal displacement to the hinges 4 of the reverser doors, but only a pivotal motion. Consequently the actuator 8 pivots the reverser nozzle assembly to its fully deployed position as shown on FIGS. 1, 2, and 7.

With reference to FIGS. 2, 6, and 13 the actuator 8 is now moving the reverser nozzle assembly from its deploy position towards its stow position. A remarkable aspect of this assembly is that the reverser doors hinges 4 remain in their deploy position P3 as they are still longitudinally locked by the downstream locking levers 16 that prevent the longitudinal forward motion of the upstream extension 14 of the supporting arms 7.

The unlocking means of the downstream locking levers 16 are substantially rollers 34 mounted on the reverser doors, for example on deployment clevises 35 on which are connected one end of the reverser door driving links 9. Since the rollers 13 are still away from their corresponding tracks 11 of retainer 10, and as shown in FIG. 6 the unlocking rollers 34 are just starting to contact the downstream locking levers 16; and the reverser doors hinges 4 cannot yet be longitudinally unlocked, and consequently they remain in position P3.

With reference to FIGS. 6 and 11 the receptacles 12 supporting the rollers 13 are moving radially inward towards their stow position. Rollers 13 have now re-engaged the substantially vertical downstream extremity or face 33 of retainer 10. Also the unlocking cam 36 shown in FIGS. 11 and 12 that is part of retainers 12 starts to contact the distal-end ramps 37 of stops 18.

Figure 14:
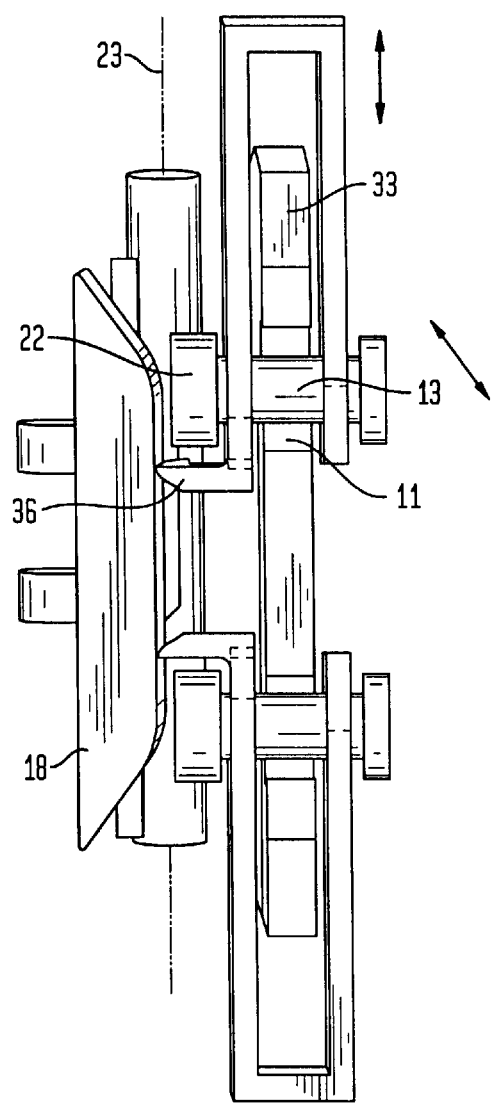
FIG. 14 is an elevational view of the forward locking mechanism, like FIG. 13, as the reverser doors are being stowed.

As receptacles 12 continue to move inwards toward each other, the unlocking cams 36, through ramps 37 of stops 18, force the upstream locking plates 24,27 which support stops 18,15, to pivot around the axis 23 as shown in FIGS. 13 and 14. This allows the automatic or self-unlocking of the upstream locking means without energizing its controlling actuator 17, and consequently the rollers 22 can further move inwards towards each other.

With reference to FIGS. 6 and 13 it is only when the rollers 13 have reached a predetermined position within the substantially vertical branch of the retainer 10 that the rollers 34 contact the locking levers 16 and consequently will be able to push inward to unlock them as the rollers 13 move further inwards toward each other.

Once rollers 13 are contacting their associated tracks 11 (FIGS. 5 and 14) the downstream locking levers 16 are fully unlocked by the associated unlocking means 34 allowing the actuator 8 to continue the stowing sequence of the reverser nozzle assembly. The rollers 13 continue their upstream travel in their associated guiding tracks 11 to reach position R2 from position R3 while the hinges of the reverser doors move longitudinally from position P3 to position P2 (FIG. 2). The rollers 22 are automatically relocked by stop 18 (FIG. 9).

With reference to FIGS. 9 and 10 the unlocking cam 36 contacts the back of stop 15 forcing the upstream locking plates 24,27 to rotate around the pivoting axis 23. This allows the automatic unlocking of the upstream locking means without energizing its controlling actuator 17, and consequently, the rollers 13 can move from position R2 to position R1 while the reverser door hinges move longitudinally from position P2 to position P1 (FIG. 2). The rollers 22 are then automatically relocked by stop 15 as the spring-loaded actuator 17 returns the displaced plate 24 to trap the roller 22. This completes the stowing sequence.

As illustrated schematically in FIG. 2, the first lock includes the axial track 11 with an inlet facing aft for receiving the latch pin 13 for radial or lateral retention thereof over the predetermined axial travel provided by the length of the track. The thrust reverser doors may therefore be axially translated for varying nozzle exhaust area as the swing links 20 raise or lower the aft ends of the doors.

In FIG. 6, when the doors are translated aft to clear the latch pins 13 from the guide tracks 11, the swing arms 20 are axially locked in position by the abutting first and second levers 14,16. The reverser doors may then be pivoted open around the distal ends of the swing arms, without those swing arms themselves moving axially.

As shown in FIGS. 1 and 2, the pair of semi-arcuate nozzle shells 6 are pivotally mounted at the aft ends of the two reverser doors 3 on the corresponding trailing arms 7. The trailing arms in turn are pivotally mounted to the distal ends of the swing arms 20 on the common pivot axes 5.

Each of the nozzle shells is additionally joined to the corresponding reverser door by a pair of circumferentially spaced apart follower links 38 pivotally joined at opposite ends thereof for permitting simultaneous deployment of the doors and shells to different positions.

As shown in FIG. 1, the nozzle shells 6 provide a planar outlet for the engine which reduces drag losses otherwise found in scarfed outlets without such shells. Note that the trailing edges of the reverser doors themselves are scarfed or inclined rearwardly to permit the opposing doors to pivot fully open until the trailing edges thereof come in close contact or abutment with each other.

Each of the nozzle shells 6 is linked to a corresponding reverser door by the two trailing arms 7 at the corresponding swing arms, and at the two follower links 38 at the tops of the doors. In this way, the reverser doors may fully deploy while the nozzle shells separately rotate relative thereto. And, when the reverser doors are stowed, the nozzle shells return to their cooperating planar position for defining the discharge outlet or throat for the integrated reverser nozzle.

Note that the common swing arms 20 mount both the reverser doors 3 at their hinge arms 4 and the nozzle shells 6 at their trailing arms 7, as shown in FIG. 5 for example. The common swing arms 20 provide the multiple functions of permitting variable area operation of the nozzle as the swing arms are pivoted forward and aft by axial translation of the reverser doors, followed by reverser door deployment as the hinge arms 4 pivot around the swing arms.

The downstream lock provided by the abutting levers 14,16 prevents pivotal movement of the swing arms during reverser door pivotal deployment. Locking of the levers 14,16 is conveniently effected by the leaf springs 31 which bias the second levers 16 radially outwardly toward the corresponding first levers 14 extending from the trailing arms 7.

By introducing the unlocking roller 34 radially inwardly of the corresponding clevises 35, the rollers 34 may simply contact the second levers 34 during retraction of the pivoted doors which uses the doors themselves as the driving force to unlock the two levers 14,16 from each other. The swing arms 20 may then be pivoted axially forwardly as the latch pin 13 at the front end of the doors is guided forwardly in the guide tracks 11.

FIGS. 8–14 illustrate one embodiment of the upstream locking mechanism wherein the mounting plate 24 is joined to the pipe for pivoting outwardly away from the track 11 to permit axial movement of the latch pin along the track.

Figure 8:
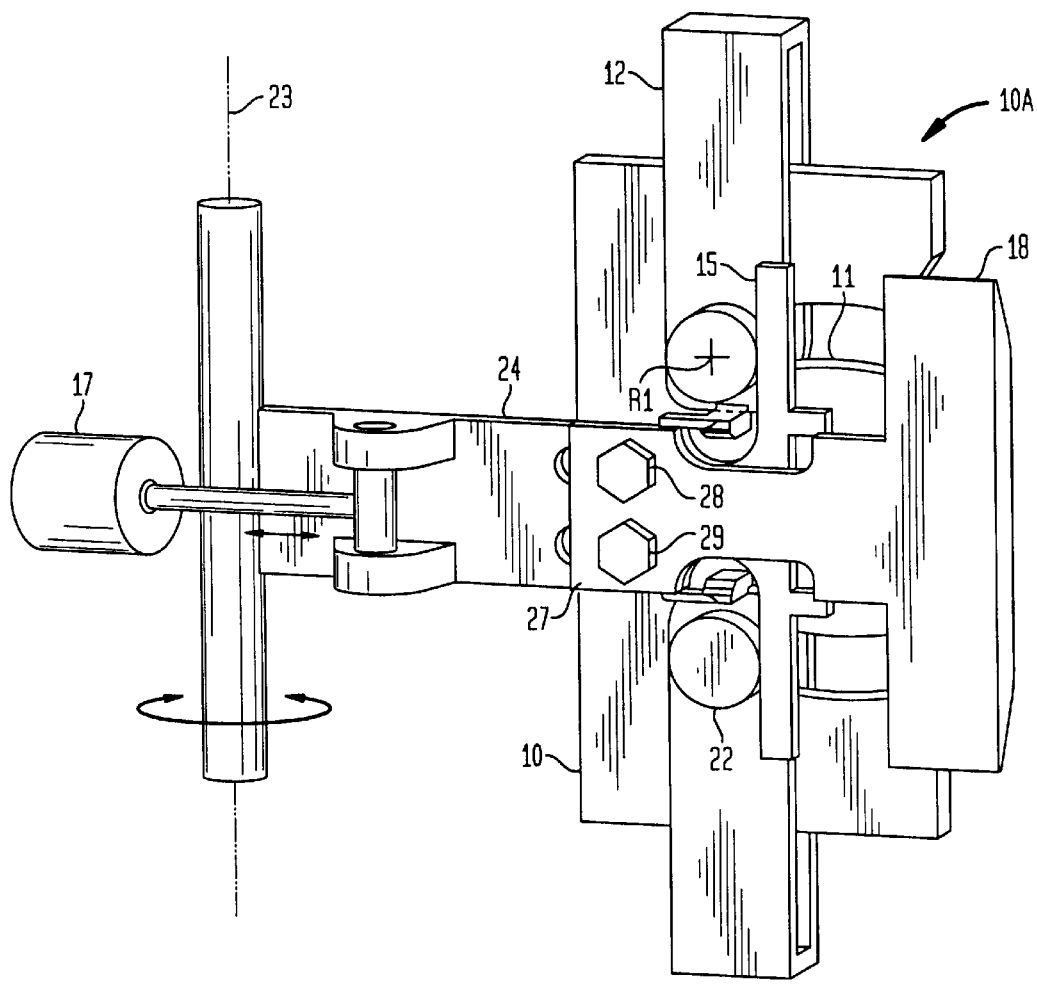
FIG. 8 is a side isometric view of the forward locking mechanism of FIGS. 1–6 shown in isolation in accordance with an exemplary embodiment for locking the reverser doors in their stowed position.

As shown in FIG. 8, the first tab 15 is integral with the distal end of the first fitting plate 24, and the second tab 18 is integral with the distal end of the second fitting plate 27. The bolts 28,29 extend through the oblong apertures in the mounting plate 24 for permitting axial adjustment of the location of the second tab 18. In this way, the axial spacing between the two tabs 15,18 is adjustable and correspondingly permits adjustment of the axial position of the reverser doors for adjusting the desired maximum discharge flow area of the exhaust nozzle as dependent on the pivoted position of the corresponding swing arms 20.

As shown in FIGS. 10–12, the second tab 18 is disposed aft of the guide track 11, and includes the tip ramp 37 facing outwardly toward the latch pin 13. Correspondingly, the latch clip 12 includes the unlocking cam extension 36 disposed below the latch pin. The cam extends both outwardly and forwardly from the latch clip, and is sized to engage the tip ramp 37 to displace the second tab 18 and mounting plate 27 outwardly away from the guide track 11 for receiving the latch pin therein. FIG. 13 illustrates the cam 36 being driven radially inwardly or downwardly for driving the ramp 37 in the left direction in FIG. 13 against the closing force of the internal spring of the lock actuator 17.

In FIG. 14, the cam 36 displaces the second stop 18 suitably away from the roller 22 at the distal end of the latch pin 13 to permit entry of the latch pin into the guide track 11.

As the reverser door is driven forwardly by the deployment actuator 8, the latch pin and the roller 22 as illustrated in FIG. 10 will move forwardly of the aft tab 18, with the cam 36 then engaging the inner surface of the forward tab 15 for maintaining outwardly the first tab 15 away from the guide track 11 to permit further axially forward movement of the latch pin and roller. As soon as the cam 36 clears the forward end of the forward tab 15, the internal spring of the lock actuator 17 returns the first and second tabs 15,18 to their original position adjacent the guide track 11, which locks the first tab 15 axially behind the latch roller 22.

Figure 15:
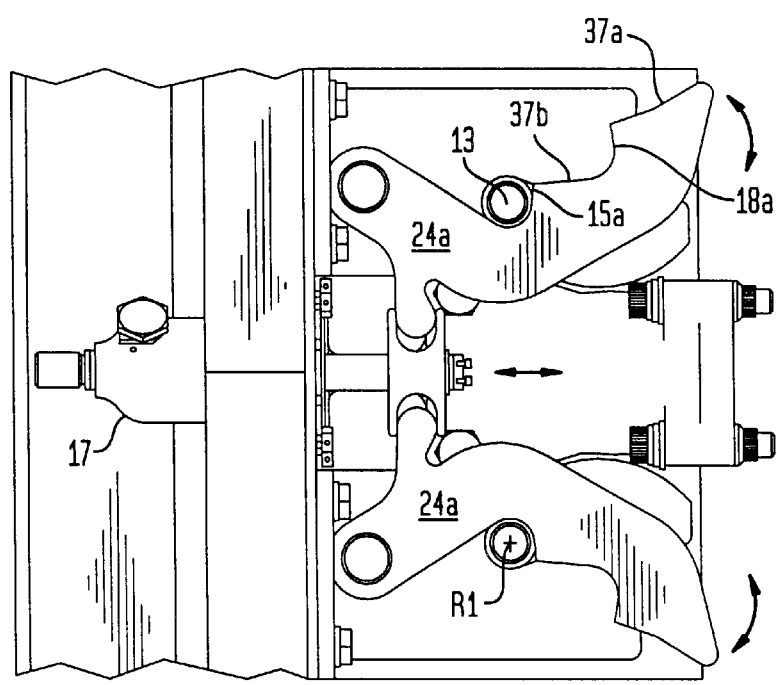
FIG. 15 is a side elevational view of the forward locking mechanism in accordance with an alternate embodiment in which the reverser doors are locked in their stowed position.
Figure 16:
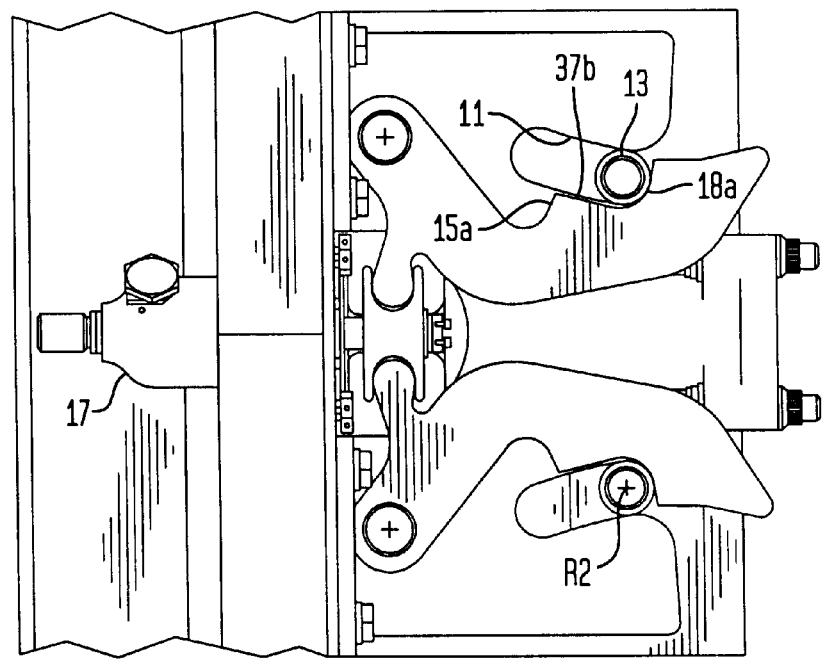
FIG. 16 is a side elevational view, like FIG. 15, in which the forward locking mechanism permits limited axial movement of the reverser doors for a variable-to-maximum area operation thereof.
Figure 17:
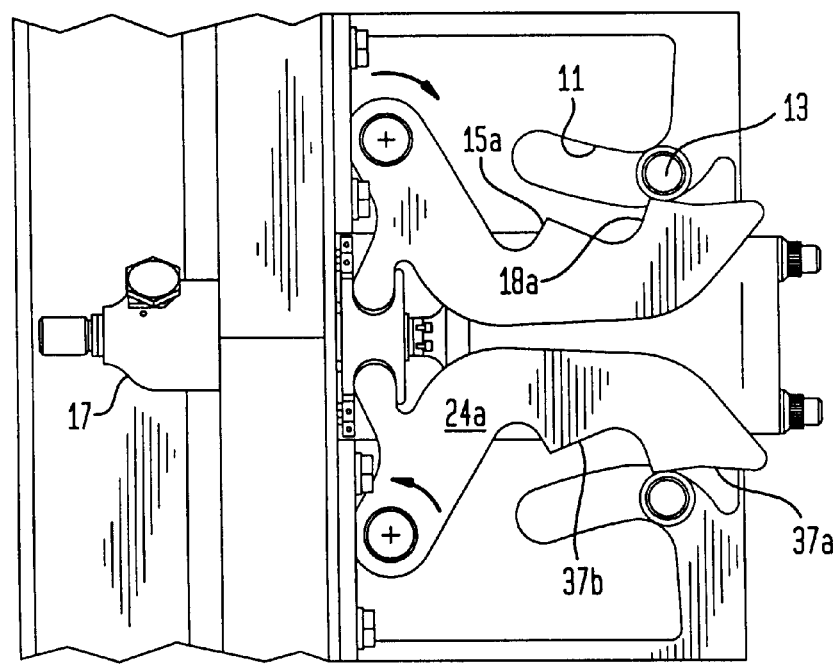
FIG. 17 is a side elevational view, like FIG. 16, in which the reverser doors are liberated from the forward locking mechanism and automatically re-engaged therewith during the stowing sequence.

FIGS. 15–17 illustrate an alternate embodiment of the forward locking mechanism or means in which a mounting plate 24a is joined to the jet pipe for lateral pivoting movement in the radial or vertical direction below the corresponding guide track 11 for permitting axial movement of the latch pin 13 along the track. In this embodiment, the first and second stop tabs 15a, 18a are integral with the mounting plate 24a in a unitary construction therewith, and are formed by corresponding ramps 37a,b and notches therein. Each mounting plate 24a therefore has a generally sawtooth-type configuration.

In this embodiment, the guide track 11 is arcuate as best illustrated in FIG. 17, and the corresponding ramps 37a,b adjacent the notch tabs 15a, 18a are similarly arcuate for permitting axial travel of the latch pin along the ramps and track.

In FIG. 15, the lock actuator 17 includes an internal spring for biasing the output rod thereof in its extended, axially aft position. The actuator rod includes a pulley wheel at its distal end which engages corresponding tongues of the mounting plate 24a. The latch pins 13 are initially trapped by the first notch tabs 15a in the fully stowed position of the reverser doors, having minimum discharge exhaust area.

Upon energizing the actuator 17 as shown in FIG. 16, its output rod is driven forward to pivot inwardly the two fitting plates 24a for permitting the latch pins 13 to clear the first notch tabs 15a to enter the corresponding ramps 37b. The second notch tabs 18a prevent further axial travel of the latch pins 13, and maintain the axial position of the reverser doors at the desired maximum discharge area.

By again energizing the actuator 17 as illustrated in FIG. 17, the fitting plates 24a are further pivoted radially inwardly to free the latch pins 13 from the second notch tabs 18a to reach the downstream ramps 37a. In this position, the latch pins 13 are free to leave the axial extent of the guide tracks 11 for permitting pivotal deployment of the reverser doors to their thrust reversal positions.

After thrust reverse operation, the doors are pivoted radially inwardly, with the corresponding latch pins 13 first engaging the ramps 37a illustrated in FIG. 17 for automatically displacing radially inwardly the fitting plates 24a without the need for energizing the actuator 17. In this way, the reverser door driven by the deployment actuator 8 automatically opens the upstream lock for permitting the latch pin 13 to enter the guide track 11 as it travels axially forwardly.

The pin then reaches the second ramp 37b illustrated in FIG. 16 and continues to be driven axially forwardly along the guide track 11. Once the pin 13 reaches the first notch tab 15a as shown in FIG. 15, the internal spring of the actuator 17 drives the fitting plate 24a radially outwardly to trap and lock the latch pin 13 in its forwardmost axial position associated with stowed position of the reverser doors.

In the corresponding embodiments of the forward locking mechanism illustrated in FIGS. 6–17, the first and second stop tabs thereof are spring loaded by actuator 17 to lock the latch pin 13 in the stowed, minimum area position of the reverser doors, and in the radially locked, maximum discharge area position of the doors. Correspondingly, the two levers 14,16 of the aft locking mechanism illustrated in FIG. 6 are also spring loaded to lock the swing arms 20 in their aft pivotal positions for reverser door pivotal deployment.

In both embodiments of the forward locking mechanism, those mechanisms are configured for automatically unlocking the first and second tabs 15,18 during the stowing sequence of the doors using the latch clips to displace the tabs against the spring loads thereon. Complete retraction of the reverser doors from their deployed position may therefore be achieved without energizing the lock actuator 17.

In contrast, the lock actuator 17 must be energized for deploying the thrust reverser doors by selectively displacing the first and second tabs away from the latch pins for permitting axially aft travel of the door.

The cooperating levers 14,16 of the aft locking mechanism are also configured as described above for automatic engagement with each other to lock the swing arms 20 during pivotal deployment of the doors. Correspondingly, the two levers 14,16 cooperate with the rollers 34 for automatically disengaging the levers to unlock the swing arms 20 during pivotal stowing of the doors.

In this way, positive actuation of the lock actuator 17 is required for deploying the thrust reverser doors during landing operation of the aircraft being powered by the engine. However, locking of the swing arms during door deployment is automatic; unlocking of the swing arms during door retraction is also automatic; and, relocking of the latch pin 13 behind the two stop tabs 15,18 is also automatic during retraction of the doors to their stowed position.

As illustrated schematically in FIG. 2, the guide tracks 11 in the upstream lock mechanism have an axial length corresponding with the axial travel of the latch pins 13 and swing arms 20 between the aft position thereof R3,P3 and the forward position thereof R1,P1 for permitting disengagement of the latch pin from the guide track only after the swing arm is suitably deployed aft. In this way, the upstream and downstream locking mechanisms are configured for coordinated locking of the latch pins 13 and the swing arms 20 to permit selected axial deployment or travel of the doors while the upstream lock mechanism engages the latch pins 13, and permitting pivotal deployment of the doors while the downstream lock mechanism engages the swing arms 20.

In the preferred embodiment illustrated in FIG. 2, the swing arms 20 extend outwardly opposite from each other toward the opposite doors 3, and include a forward inclined position P1 corresponding with the stowed position of the doors and latch pin (R1), with the nozzle having the minimum discharge flow area. The swing arms also have an intermediate, colinear radially aligned position P2 corresponding with the aft travel of the doors and latch pin (R2) having a maximum discharge flow area of the nozzle. The aft inclined position P3 of the swing arms corresponds with pivotal deployment of the doors during thrust reversal.

The guide track 11 illustrated in FIG. 2 has an axial length configured for laterally or radially retaining the latch pin 13 as the doors are axially translated between the stowed and intermediate positions (R1,R2), with the upper side of the track terminating to radially liberate the latch pin as the doors translate further aft to the aft position (R3).

The coordinated positions of the latch pin and swing arm in the door stowed position (R1,P1), maximum discharge area position (R2,P2), and pivotal deployment position of the doors (R3,P3) is readily coordinated by the configuration of the guide track 11 and the pivotal range of the swing arms 20. The latch pin 13 is correspondingly locked in the guide track 11, and the swing arms are correspondingly locked in their aft positions as required for coordinating the deployment and retraction sequences of the thrust reverser doors.

Accordingly, a single deployment actuator 8 is used on each side of the integrated nozzle for simultaneously deploying both reverser doors 3 with controlled movement, notwithstanding the additional rotary movement provided by the swing arms 20. The swing arms are locked when required during pivotal deployment of the doors, and unlocked when required during axial deployment and retraction of the doors. Correspondingly, the forward ends of the doors are locked at the latch pins by the forward lock mechanisms, with controlled axial movement within the corresponding guide tracks 11.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbofan exhaust nozzle comprising:
   a jet pipe for discharging exhaust gases;
   a pair of thrust reverser doors disposed on opposite sides of said pipe, each of said doors having a hinge arm at an aft end pivotally joined to one end of a swing arm, with an opposite end of said swing arm being pivotally joined to said pipe;
   each of said doors also including a latching clip at a forward end, and a deployment clevis disposed between said clip and hinge arm;
   a common deployment actuator affixed to said pipe and connected to both said doors by corresponding deployment links joined to said clevises, said actuator being configured to drive said links aft to pivot aft said doors and swing arms;
   a first lock disposed at a forward end of said actuator for selectively locking said latching clip; and
   a second lock disposed at an aft end of said actuator for selectively locking said swing arm in a pivoted-aft position thereof.

2. A nozzle according to claim 1 wherein:
   said clip includes a latch pin at a distal inner end;

said first lock includes an axial guide track having an inlet facing aft for receiving said pin to radially retain said pin over a predetermined axial travel; and said second lock includes a first lever extending forward from said swing arm, and a second lever extending aft from said actuator for selectively engaging said first lever to lock said swing arm in said aft position.

3. A nozzle according to claim 2 wherein said first lock further comprises:

a mounting plate pivotally joined to said pipe, and having first and second axially spaced apart tabs sized to engage said latch pin; and a lock actuator joined to said plate for selectively pivoting said plate to trap said pin in turn by said first and second tabs.

4. A nozzle according to claim 3 wherein said mounting plate is joined to said pipe for pivoting outwardly away from said track to permit axial movement of said latch pin along said track.

5. A nozzle according to claim 3 wherein said first tab is integral with said mounting plate, and said second tab is integral with a fitting plate adjustably mounted to said mounting plate for controlling axial spacing between said first and second tabs.

6. A nozzle according to claim 3 wherein:

said second tab is disposed aft of said guide track, and includes a ramp facing outwardly toward said latch pin; and said latch clip includes an unlocking cam disposed below said latch pin sized to engage said ramp on said second tab to displace said second tab and mounting plate away from said guide track for receiving said pin therein.

7. A nozzle according to claim 6 wherein said unlocking cam extends both outwardly and forwardly from said latch clip, and is further sized to engage said first tab to displace said first tab and mounting plate away from said guide track for permitting said latch pin to further enter said guide track.

8. A nozzle according to claim 3 wherein said mounting plate is joined to said pipe for lateral pivoting below said track to permit axial movement of said latch pin along said track.

9. A nozzle according to claim 8 wherein both said first and second tabs are integral with said mounting plate, and are formed by corresponding ramps and notches therein.

10. A nozzle according to claim 9 wherein said guide track is arcuate, and said ramps in said mounting plate adjacent said notch tabs are similarly arcuate for permitting axial travel of said latch pin along said ramps and track.

11. A nozzle according to claim 3 wherein said second lock further comprises:

a spring biasing said second lever outwardly toward said door clevis; and said door clevis includes an unlocking roller aligned with said second lever for displacing inward said second lever as said door is pivoted closed to disengage said second lever from said first lever.

12. A nozzle according to claim 11 further comprising:

a pair of nozzle shells pivotally mounted at aft ends of said doors on corresponding trailing arms, with said trailing arms being in turn pivotally mounted to said swing arms on common pivot axes with said door hinge arms; and each of said trailing arms includes a corresponding first lever extending forward therefrom and integral therewith for engaging a corresponding second lever in said second lock.

13. A nozzle according to claim 12 wherein each of said nozzle shells is additionally joined to a corresponding reverser door by a pair of follower links to permit simultaneous deployment of said doors and shells to different positions.

14. A nozzle according to claim 11 wherein said guide track in said first lock has an axial length corresponding with axial travel of said swing arm between said aft position thereof and a forward position for permitting disengagement of said latch pin from said guide track only after said swing arm is deployed aft.

15. A nozzle according to claim 14 wherein:

said first and second levers of said second lock axially overlap each other, and said unlocking roller engages said second lever between said forward and aft positions of said swing arms; and said second lever pivots outwardly to axially abut said first lever immediately following pivoting outward of said reverser doors as said unlocking roller carried on said door clevis moves outwardly.

16. A turbofan exhaust nozzle comprising:

a jet pipe for discharging exhaust gases;

a pair of thrust reverser doors disposed on opposite sides of said pipe, each of said doors having a hinge arm at an aft end pivotally joined to one end of a swing arm, with an opposite end of said swing arm being pivotally joined to said pipe;

each of said doors also including a latching clip at a forward end, and a deployment clevis disposed between said clip and hinge arm;

a common deployment actuator affixed to said pipe and connected to both said doors by corresponding deployment links joined to said clevises, said actuator being configured to drive said links aft to pivot aft said doors and swing arms;

a pair of nozzle shells pivotally mounted at aft ends of said doors on corresponding trailing arms, with said trailing arms being in turn pivotally mounted to said swing arms on common pivot axes with said door hinge arms;

first means for locking said latching clips to prevent pivotal deployment of said reverser doors, while permitting axial movement of said doors between a forward stowed position and an aft intermediate axial position; and second means for locking said swing arms aft to prevent forward movement thereof at said door intermediate position, while permitting pivotal movement of said doors aft for thrust reverser deployment thereof.

17. A nozzle according to claim 16 wherein said first locking means comprise:

an axial guide track having an inlet facing aft for receiving a latch pin mounted at a distal end of said clip;

a first stopping tab for locking said clips and doors in said stowed position; and a second stopping tab spaced aft from said first tab to permit limited axial travel of said latch pin in said track, with corresponding axial travel of said doors as said swing arms pivot.

18. A nozzle according to claim 17 wherein said second locking means comprise:

a first lever extending forward from each of said trailing arms at a pivot axis with said swing arms; and a second lever extending aft from said actuator for selectively engaging said first lever to lock said swing arm aft.

19. A nozzle according to claim 18 wherein:
said first and second tabs are spring loaded to lock said latch pin; and
said first and second levers are spring loaded to lock said swing arm.

20. A nozzle according to claim 19 wherein said first locking means are configured to automatically unlock said first and second tabs during stowing of said doors using said latch clips to displace said first and second tabs against said spring load thereon.

21. A nozzle according to claim 19 wherein said first locking means further comprise an actuator for selectively displacing said first and second tabs away from said latch pin to permit axially aft travel of said door during deployment.

22. A nozzle according to claim 19 wherein said second locking means are configured for automatically engaging said first and second levers to lock said swing arm during pivotal deployment of said doors.

23. A nozzle according to claim 19 wherein said second locking means are configured for automatically disengaging said first and second levers to unlock said swing arm during pivotal stowing of said doors.

24. A nozzle according to claim 19 wherein said first and second locking means are configured for coordinated locking of said latch pins and swing arms to permit selected axial deployment of said doors while said first locking means engage said latch pins, and permitting pivotal deployment of said doors while said second locking means engage said swing arms.

25. A nozzle according to claim 24 wherein said swing arms extend outwardly opposite from each other toward said opposite doors, and include:
a forward inclined position corresponding with stowed position of said doors with minimum discharge flow area of said nozzle;
an intermediate colinear aligned position corresponding with aft travel of said doors having a maximum discharge flow area of said nozzle; and
an aft inclined position corresponding with pivotal deployed positions of said doors during thrust reversal operation.

26. A nozzle according to claim 25 wherein said guide track of said first locking means has an axial length configured for laterally retaining said latch pin as said doors are axially translated between said stowed and intermediate positions, and terminates to liberate said latch pin as said doors translate further aft to said aft position.

* * * * *